J. M. O'NEALL.
Band-Cutting Feeder for Thrashing-Machine.

No. 197,659. Patented Nov. 27, 1877.

WITNESSES:
W. W. Hollingsworth
Amos W. Cart

INVENTOR:
James M. O'Neall
BY
ATTORNEYS.

UNITED STATES PATENT OFFICE.

JAMES M. O'NEALL, OF FORT WORTH, TEXAS.

IMPROVEMENT IN BAND-CUTTING FEEDERS FOR THRASHING-MACHINES.

Specification forming part of Letters Patent No. 197,659, dated November 27, 1877; application filed May 9, 1877.

*To all whom it may concern:*

Be it known that I, JAMES M. O'NEALL, of Fort Worth, in the county of Tarrant and State of Texas, have invented a new and Improved Band-Cutting and Feeding Attachment for Thrashing-Machines; and I do hereby declare that the following is a full, clear, and exact description of the same.

The object of my invention is to provide an improved machine for cutting the bands of gavels or bundles of grain, and feeding the same to the cylinder of a thrasher.

The bundles are received upon an endless traveling apron provided with teeth or claws, and by it conveyed under rotary cutters, which sever the bands, the grain being then scattered or spread out by a vibrating rake into a thin sheet as it passes to the toothed cylinder.

The invention relates more particularly to the construction and arrangement of parts, as hereinafter described and claimed.

Figure 1:
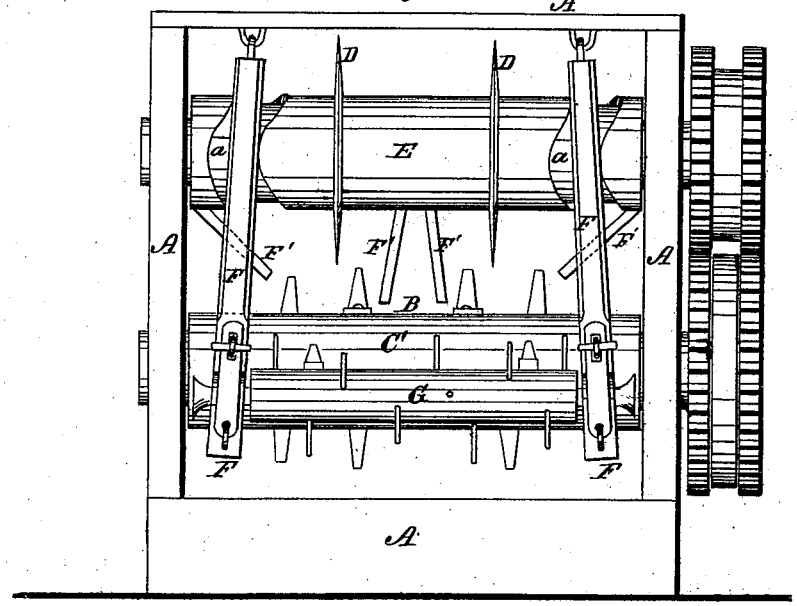
Figure 2:
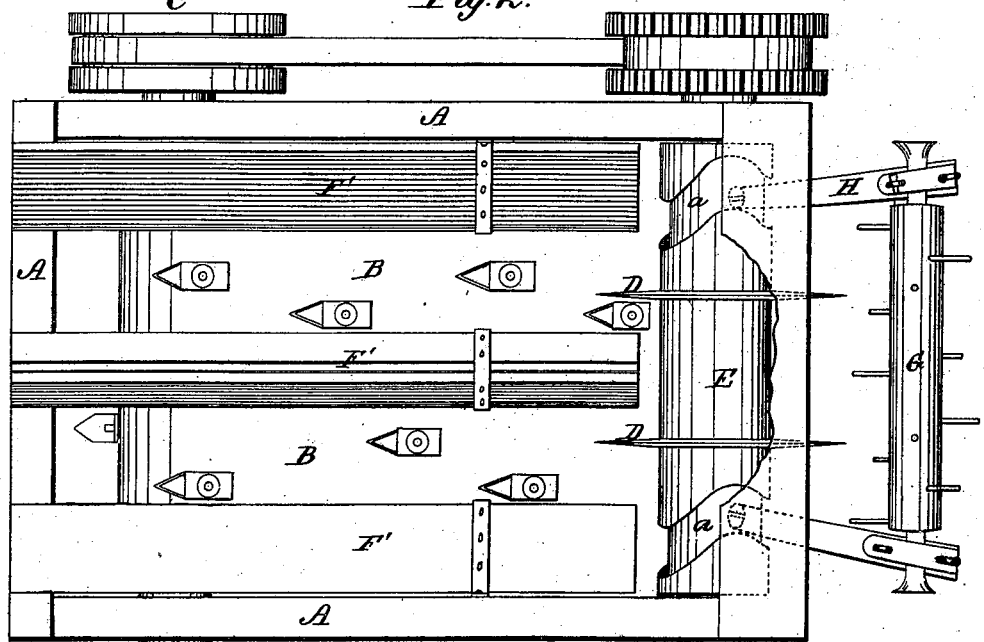

In the accompanying drawing, forming part of this specification, Figure 1 is an end elevation of the machine, and Fig. 2 is a plan view of the same.

The frame A of the machine is suitably constructed to adapt it for easy transportation, and facilitate its convenient attachment to the thrasher.

The horizontal toothed endless apron B is mounted on cylinders or shafts C C', to which rotary motion is imparted by suitable gear or band-and-pulley connection with the horse or other power employed to run the thrasher. The circular cutters D are fixed on a shaft, E, placed above the end of the apron B which is contiguous to the thrasher.

The bundles or gavels of grain are laid or delivered upon the toothed apron B, between the lengthwise guides F, and by it conveyed toward the thrasher. As they pass under the circular cutters D the latter sever the bands which confine them. But in order that the grain may be spread out or scattered in such manner as to enable the thrashing-cylinder to act upon it with the best effect, I provide a laterally-vibrating rake, which consists of a toothed roller, G, mounted or journaled loosely in bars H, which are pivoted above the shaft E, and rest, in an inclined position, in cam-grooves *a a*, cut or otherwise formed in said shaft. As the latter is rotated the shoulders or projections of the cam-grooves act against the arms H, and thereby impart a lateral vibration to the roller G, which also rotates simultaneously. The result is that the grain is spread out evenly, and in that condition passes to the thrashing-cylinder.

What I claim is—

1. The combination of the traveling apron, the rotating shaft, having cam-grooves, and the laterally-vibrating rake, consisting of the supporting-arms H and a toothed cylinder, G, carried thereon, substantially as shown and described.

2. The combination of the toothed roller G and pivoted supporting-arms H, loosely connected to the frame, as described, with the traveling apron B, as and for the purpose specified.

JAMES MADISON O'NEALL.

Witnesses:
J. J. MILLER,
J. H. O'NEALL.